United States Patent [19]
Kawano

[11] Patent Number: 5,302,998
[45] Date of Patent: Apr. 12, 1994

[54] CAMERA WITH INSTALLATION STRUCTURE OF LENS FOR LIGHT MEASUREMENT

[75] Inventor: Kiyoshi Kawano, Tokyo, Japan

[73] Assignee: Asahi Kogaku Kogyo Kabushiki Kaisha, Tokyo, Japan

[21] Appl. No.: 945,701

[22] Filed: Sep. 16, 1992

[30] Foreign Application Priority Data

Sep. 17, 1991 [JP] Japan .................. 3-310258

[51] Int. Cl.⁵ .................................... G03B 7/099
[52] U.S. Cl. .................... 354/476; 354/482; 354/483
[58] Field of Search ............ 354/476, 288, 482, 483

[56] References Cited

U.S. PATENT DOCUMENTS

| | | |
|---|---|---|
| 2,959,092 | 11/1960 | Faulhaber ............... 354/482 |
| 3,127,823 | 4/1964 | Babcock et al. ......... 354/476 |
| 3,221,624 | 12/1965 | Haupt et al. ............ 354/476 |
| 3,282,180 | 11/1966 | Hutchison et al. ...... 354/476 |
| 3,307,462 | 3/1967 | Hutchison et al. ...... 354/476 |
| 3,470,805 | 10/1969 | Suzuki et al. . |
| 4,666,275 | 5/1987 | Tamamura ............... 354/476 |
| 4,949,118 | 8/1990 | Yamamoto et al. . |
| 5,136,326 | 8/1992 | Yokota et al. . |
| 5,138,362 | 8/1992 | Kobayashi et al. . |
| 5,144,493 | 9/1992 | Nomura . |

Primary Examiner—Russell E. Adams
Attorney, Agent, or Firm—Sandler Greenblum & Bernstein

[57] ABSTRACT

Described is a camera with an installation structure of lens for light measurement. The camera includes a camera body having a front surface to which a photographing lens is mounted, and through which a hole is formed. A light-receiving element is provided in the camera body, and a lens for light measurement is installed in the hole and has a front surface located at an objective side, for focusing an objective image light onto the light-receiving element. The front surface of the lens for light measure is positioned substantially on the same plane as the front surface of the camera body.

8 Claims, 7 Drawing Sheets

BEST AVAILABLE COPY

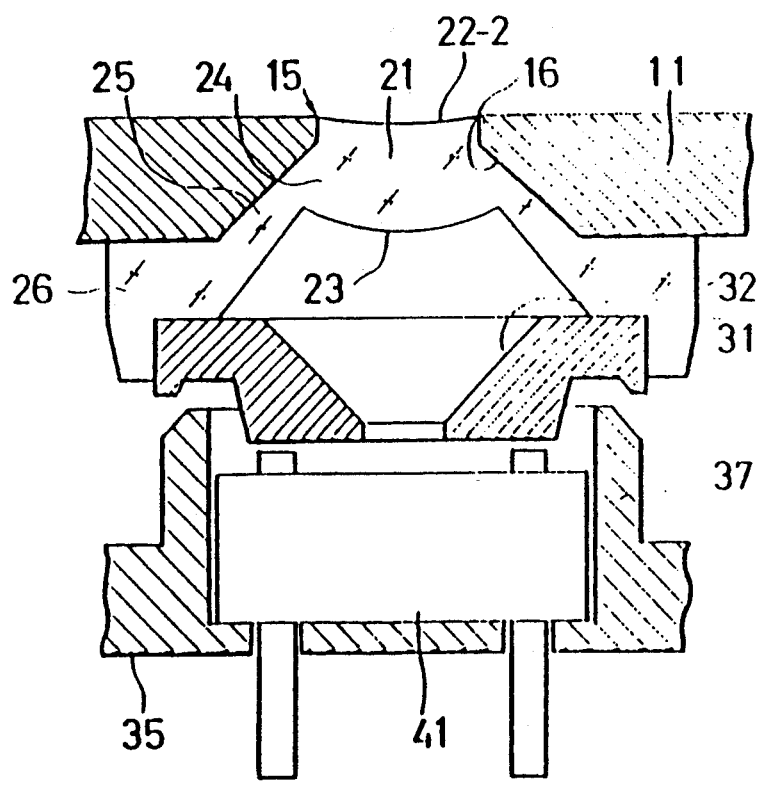

CAMERA WITH INSTALLATION STRUCTURE OF LENS FOR LIGHT MEASUREMENT

BACKGROUND OF THE INVENTION

The present invention relates to a camera with an installation structure of a lens for light measurement by which a lens for light measurement is installed in a camera.

A lens for light measurement of a lens-shutter type camera is provided in a camera body in such a manner that its light-receiving portion is disposed adjacent to the photographing lens. This light receiving portion includes a light-receiving element and a lens for focusing an objective image light onto the light-receiving element. Such a conventional lens for light measurement and its vicinity structure are shown in FIGS. 1, 2 and 3.

FIG. 1 is a perspective view showing a conventional lens-shutter type camera. A camera body 51 is provided with a photographing lens 52 at a central portion on its front surface, a finder 53 above the photographing lens 52, and a release button 54 on its top surface. Then, a circular photometry hole 55 is opened adjacent to the photographing lens 52. A lens 61 for light measure is disposed at an innermost end of the photometry hole 55.

An installation structure of this lens 61 for light measurement is explained with reference to FIGS. 2 and 3. The photometry hole 55 is formed in such a manner that a diameter at a cross-sectional plane, which is parallel to a front surface of the camera body 51, becomes small as this cross-sectional plane is located toward an innermost side of the photometry hole 55 (i.e., hole 55 is bevelled). The lens 61 for light measure is coupled into this photometry hole 55 from the inside of the camera body 51. An objective side surface of the lens 61 for light measurement is formed as a convex surface 62, and this convex surface 62 is located just inside of the photometry hole 55.

The lens 61 for light measurement is fixed to the camera body 51 by a lens and a light receiving holder 71. The lens and light receiving holder 71 comprises a diaphragm portion 73 for limiting a quantity of light entering a light receiving element 81. The light-receiving element 81 is disposed behind the lens and light receiving holder 71. The light-receiving element 81 is accommodated in an enclosed cylinder (i.e. a light-shielding cylinder) 77. The enclosed cylinder 77 is fixed on a fixing plate 75, the fixing plate 75 is secured to the camera body 55.

However, in the above-described lens for light measurement there was a problem such that dust or dirt or water droplets tend to remain in the photometry hole 55. When such an obstacle is left in the photometry hole 55, the light quantity reaching the light-receiving element 81 is decreased.

Therefore, brightness of the objective is mistakenly judged to be smaller and, as a result, the photograph becomes overexposed. Or, a photometry distribution will be unexpectedly changed. For example, a central intensified photometry becomes as if it were an averaged photometry and, accordingly, an appropriate exposure amount is not obtained.

Moreover, since it is usual that the photometry hole 55 has a small diameter, removing dust and the like from the inside of the photometry hole 55 is not easy.

SUMMARY OF THE INVENTION

It is therefore an object of the present invention to provide a camera with an installation structure of a lens for light measure, capable of preventing an obstacle such as dust or water droplets from adhering on a front surface of the lens for light measure.

In order to accomplish the above object, a camera with an installation structure of a lens for light measure according to the present invention includes: a camera body having a front surface to which a photographing lens is mounted, and on which a hole is formed; a light-receiving element provided in the camera body; and a lens for light measurement which is installed in the hole and has a first surface located at an objective side, for focusing an objective image light onto the light-receiving element, the first surface of the lens for light measurement is positioned substantially on the same plane as the front surface of the camera body.

With this arrangement, no recessed portion is formed between the lens for light measurement and the camera body. Thus, it becomes possible to prevent dust or water droplets and the like from adhering or remaining on the front surface of the lens for light measurement.

The above and other objects, features and advantages of the present invention will become more apparent from the following detailed description which is to be read in conjunction with the accompanying drawings.

BRIEF DESCRIPTION OF THE DRAWINGS

FIGS. 7A to 7C are views showing other installation structures of the lens for light measurement in accordance with other embodiments of the present invention.

DETAILED DESCRIPTION OF THE PREFERRED EMBODIMENTS

Hereinafter, referring now to the accompanying drawings, preferred embodiments of the present invention are explained in detail.

Figure 1:
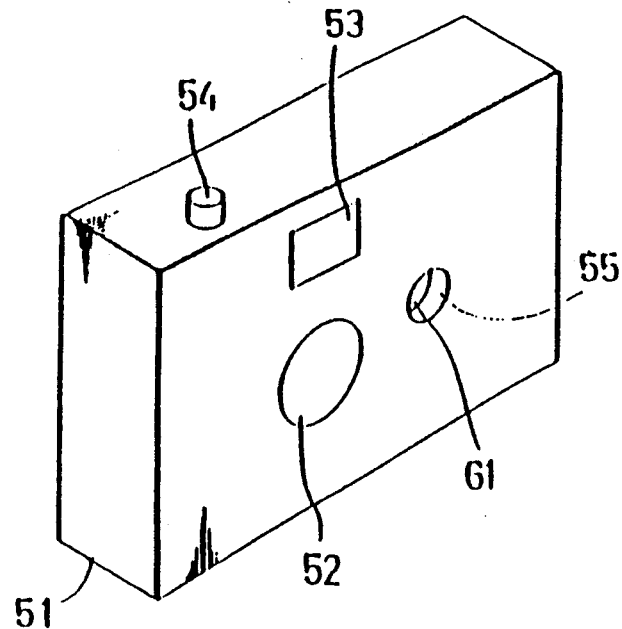
FIG. 1 is a perspective view showing a conventional lens-shutter type camera.
Figure 2:
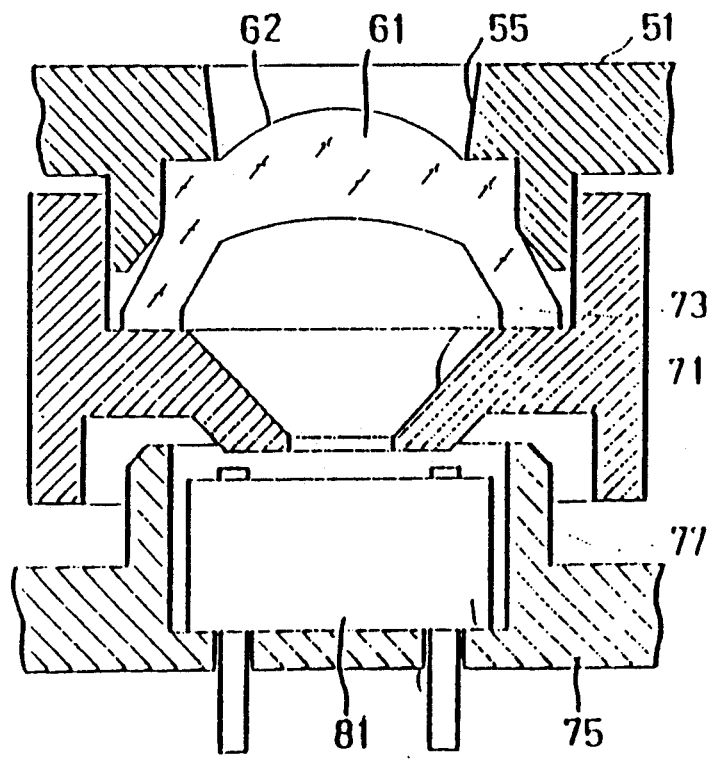
FIG. 2 is an enlarged cross-sectional view showing a lens for light measurement and its vicinity structure in the conventional camera shown in FIG. 1.
Figure 3:
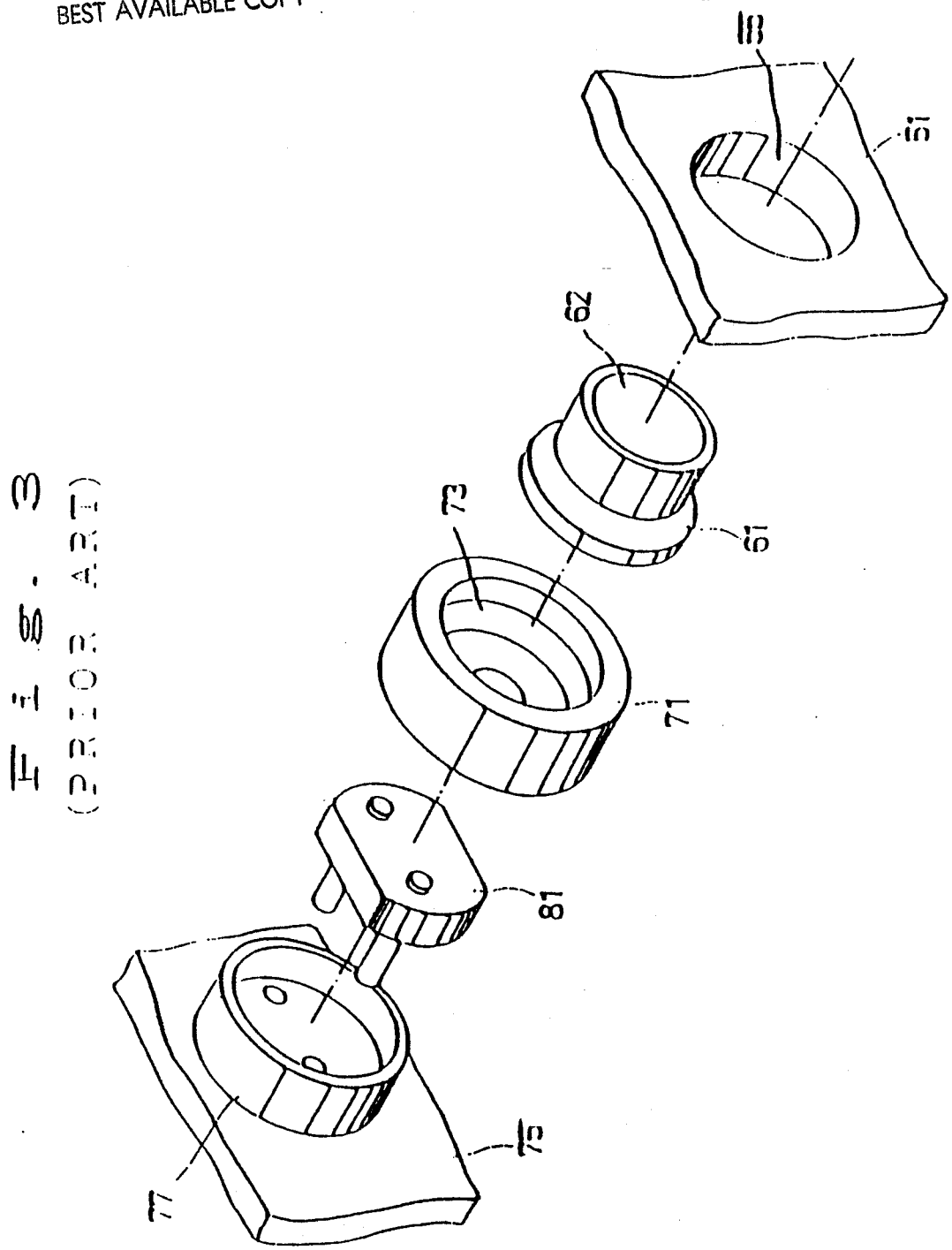
FIG. 3 is a perspective exploded diagram showing a photometry light-receiving portion including the lens for light measurement in the conventional camera shown in FIG. 1.
Figure 4:
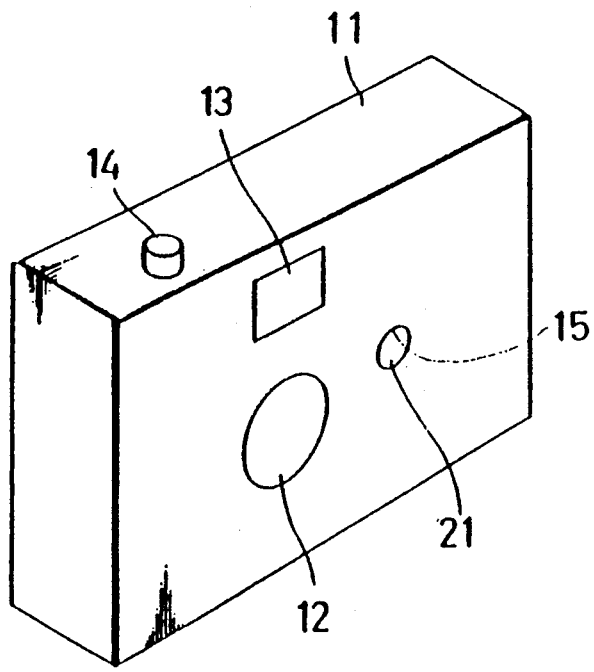
FIG. 4 is a perspective view showing an appearance of a lens-shutter type camera in accordance with one embodiment of the present invention.

FIG. 4 is a perspective view showing a lens-shutter type camera which adopts an installation structure of a lens for light measure of the photometer in accordance with one embodiment of the present invention.

In FIG. 4, a camera body 11 has an outer surface comprising a front surface, a top surface and so on, and is provided with a photographing lens 12 at a central portion on its front surface, a finder 13 at an upper portion on the front surface, and a release button 14 on its top surface. Then, a circular photometry window 15 is provided adjacent to the photographing lens 12. A lens 21 for light measurement of a photometer is coupled into the photometry window 15.

As is apparent from this drawing, a first surface (an objective side surface) 22 of the lens 21 for light measure is positioned on substantially the same plane as the front surface of the camera body 11. In other words, the first surface 22 of the lens 21 for light measure is set to be flush with the front surface of the camera body 11.

Figure 5:
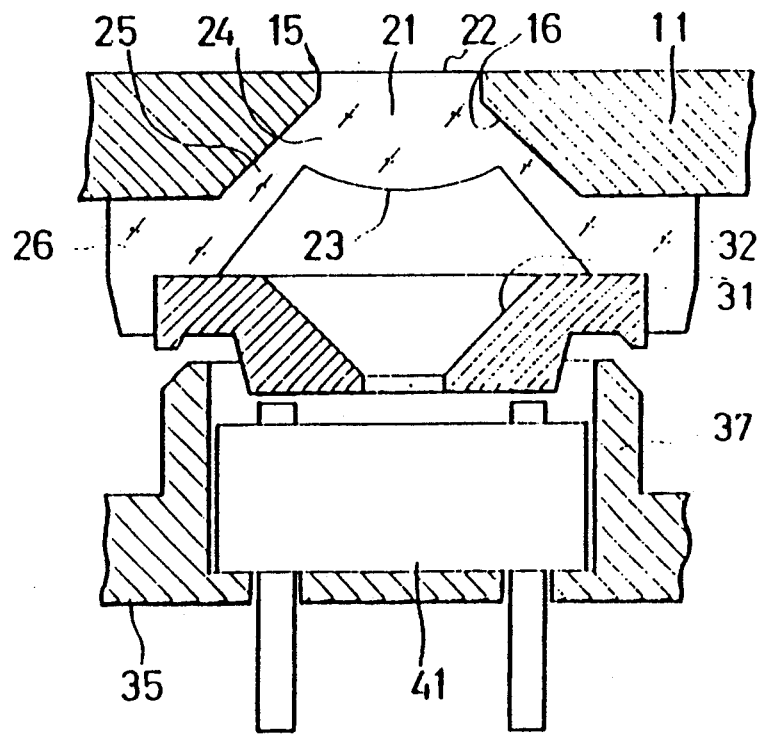
FIG. 5 is an enlarged cross-sectional view showing a lens for light measure and its vicinity in the camera shown in FIG. 4.
Figure 6:
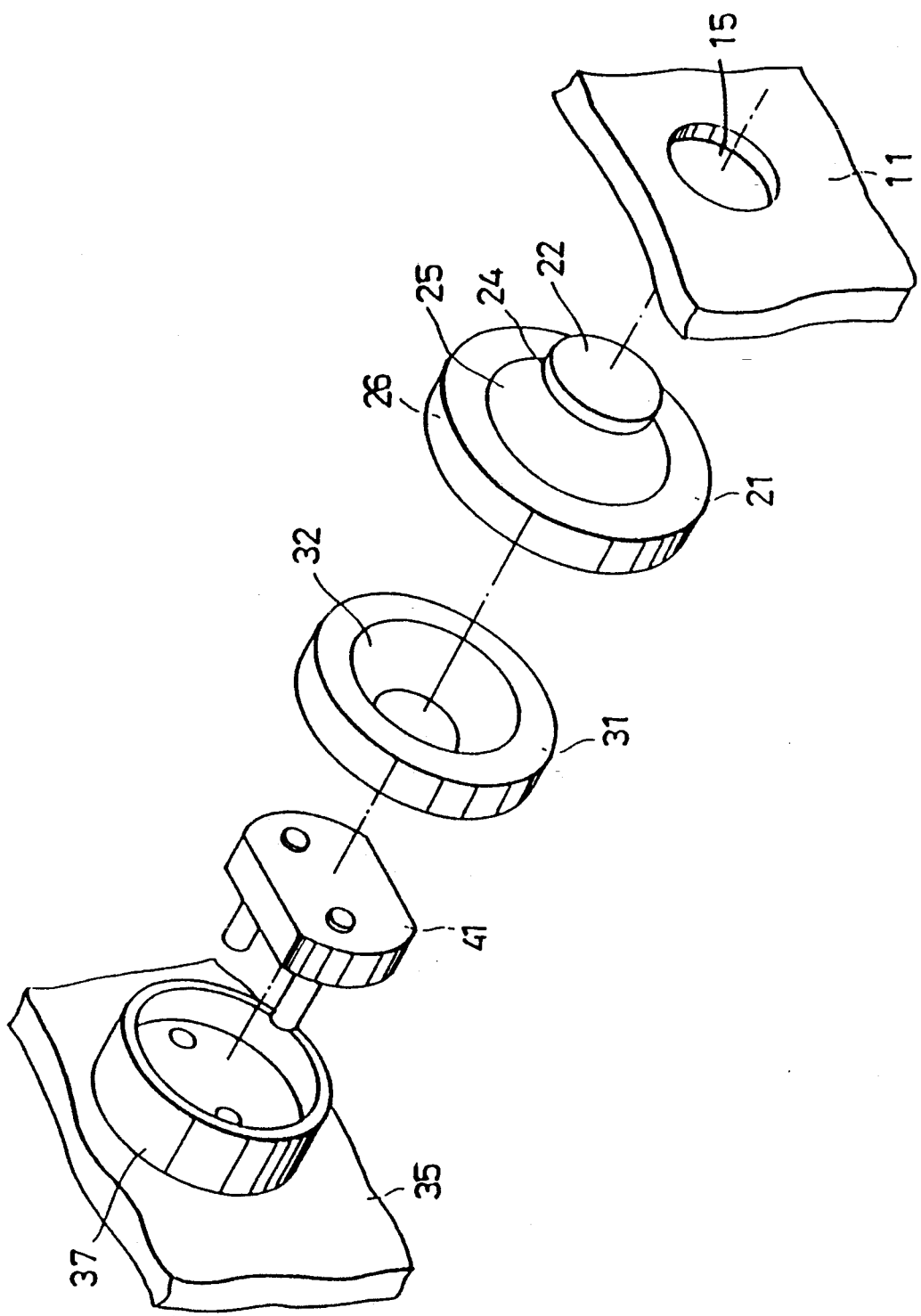
FIG. 6 is a perspective exploded diagram showing a photometry light-receiving portion including the lens for light measurement.

An installation structure of the lens 21 for light measure is explained with reference to FIGS. 5 and 6. FIG. 5 is an enlarged cross-sectional view showing a lens for light measurement and its vicinity. FIG. 6 is a perspective exploded diagram showing a photometry light-receiving portion including the lens for light measurement.

The photometry window 15 is formed to have a tapered portion 16 in such a manner that a diameter at a cross-sectional plane which is parallel to the front surface of the camera body 11 becomes large as this cross-sectional plane is located toward an innermost side of the photometry window 15 (i.e., window 15 is reverse-bevelled). The lens 21 for light measurement includes a lens portion 24 having a first surface (i.e. objective side surface) 22 which is formed as a flat surface and a second surface (i.e. a light-receiving element side surface) 23 which is formed in a convex configuration so as to have a positive refracting power as a whole.

Further, the lens 21 for light measurement includes a frame portion 25, and a base portion 26. The base portion 26 is formed in a ring shape, and the frame portion 25 is formed to extend from the base portion 25 in a truncated cone shape. A tapered-off end of the frame portion 25 is integrally connected to the lens portion 24.

The lens portion 24 and the frame portion 25 of the lens 21 for light measure are fitted into (or engaged with) the photometry window 15 and its tapered portion 16, respectively. The upper surface of the base portion 26 and the inner surface of the camera body 11 are bonded together by an appropriate adhesive material.

The configurations of the photometry window 15 and the tapered portion 16 are formed to fit to an outer configuration of the lens 21 for light measurement.

The base portion 26 is formed with a stepped (or a shoulder) portion at its inner peripheral portion. A diaphragm ring 31 is coupled into the stepped portion and fixed in it. The diaphragm ring 31 includes a diaphragm surface 32 for limiting a range of an object and a light quantity entering in a light-receiving element 41.

The light-receiving element 41 is disposed behind the diaphragm ring 31. The light-receiving element 41 is accommodated in an enclosed cylinder (i.e. a light-shielding cylinder) 37. The enclosed cylinder 37 is fixed on a supporting plate 35 which is secured to the camera body 11.

As is described in the foregoing description, in accordance with the present invention, the lens 21 for light measurement is disposed in such a manner that the first surface 22 is positioned substantially on the same plane as the front surface of the camera body 11. Therefore, even if obstacles such as dust or water droplets or the like adhere on the surface of the first surface 22, these obstacles can be naturally or quite easily removed and, therefore, the lens for light measurement is no longer bothered by the obstacles which used to remain firmly in the recessed place formed between the lens for light measure and the camera body in the prior art devices.

Furthermore, in accordance with the present embodiment, the frame portion 25 for supporting the lens portion 24 is formed in a truncated cone shape such that the tapered surface of the frame portion 25 extends toward the light-receiving element 41. Therefore, light entering obliquely from a peripheral portion of the lens portion 24 is effectively guided out of the light path. Thus, characteristics of a central intensified photometry can be improved.

The present invention is not limited to the embodiment described above, nor those illustrated in the drawings, and the invention can be modified without departing from the spirit and scope of the claimed invention.

Figure 7A:
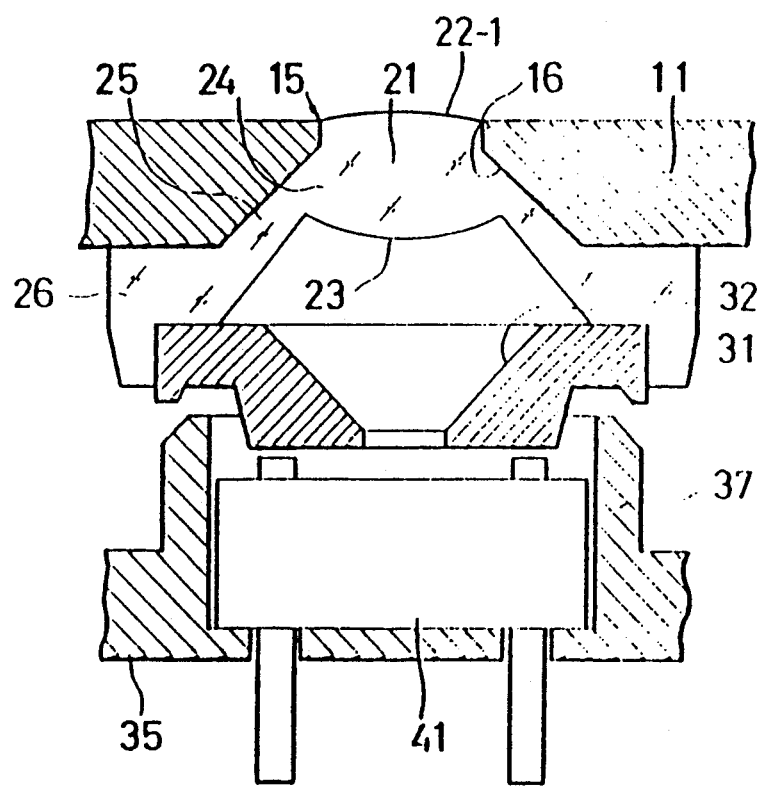
Figure 7C:
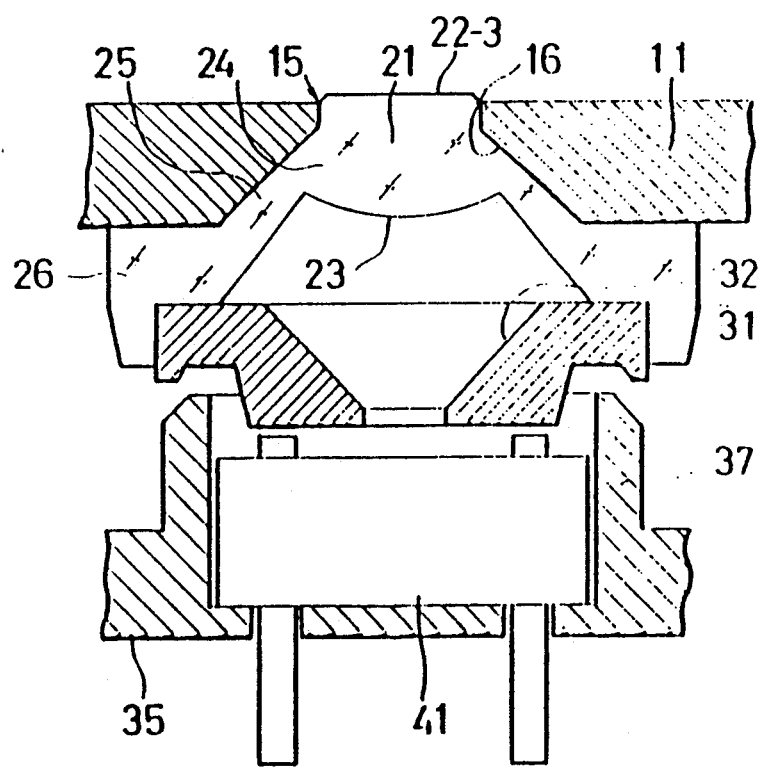

Although the first surface 22 of the lens 21 for light measure is formed in a flat surface in the above-described embodiment, this first surface 22 can be formed in a convex shape as shown by a reference numeral 22-1 in FIG. 7A, or a concave shape as shown by 22-2 in FIG. 7B. Furthermore, the first surface can be made to protrude from the front surface of the camera body 11, as shown by a reference numeral 22-3 in FIG. 7C.

Namely, any structure can be applicable as long as it does not form a recessed space which allows the obstacles such as dust or dirt or water droplets to persistently adhere to or remain in it.

In accordance with the present invention, the photometry can be accurately executed at any time.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within metes and bounds of the claims, or equivalence of such metes and bounds are therefore intended to embraced by the claims.

The present disclosure relates to subject matters contained in Japanese Patent Application No. HEI 3-310258 filed on Sep. 17, 1991, which is expressly incorporated herein by reference in its entirety.

I claim:

1. A camera with an installation structure for a light measurement lens, comprising:
    a camera body having a front surface which comprises a front outer periphery of said camera, to which a photographing lens is mounted, and on which a hole is formed;
    a light-receiving element provided in said camera body; and
    a lens for light measurement which is installed in said hole and has a first surface located at an objective side, for focusing an objective image light onto said light-receiving element, said first surface of said lens for light measurement being positioned substantially on the same plane as said front surface of said camera body and substantially flush with said front outer periphery of said camera; wherein said first surface of the lens for light measurement is formed as a flat surface so as to be positioned substantially on the same plane as the outer surface of the camera body.

2. The camera according to claim 1, wherein said lens for light measurement has a second surface being formed in a convex configuration at a light-receiving side.

3. The camera according to claim 2, wherein said lens for light measurement includes:

a ring-shaped base portion;
a frame portion extending from the base portion in a truncated cone shape; and
a lens portion formed at a tapered-off portion of the frame portion.

4. The camera according to claim 3, wherein
said lens portion and said frame portion of the lens for light measurement are fitted to the camera body, and
said base portion has a surface which is bonded to an inner surface of said camera body by an adhesive.

5. The camera according to claim 3, wherein
said base portion is formed with a stepped portion at its inner peripheral portion and
which further comprises:
a diaphragm ring which is fixedly coupled into said stepped portion.

6. The camera according to claim 5, wherein
said diaphragm ring includes a diaphragm surface for limiting a range of an object and a light quantity entering in the light-receiving element.

7. The camera according to claim 5, wherein
said light-receiving element is disposed behind said diaphragm ring.

8. The camera according to claim 3, wherein
said frame portion for supporting said lens portion is formed in a truncated cone shape such that the tapered surface of said frame portion extends toward said light-receiving element.

* * * * *